United States Patent
Kyoung et al.

(10) Patent No.: US 10,023,046 B2
(45) Date of Patent: Jul. 17, 2018

(54) NON-CYLINDER TYPE COMPOSITE PRESSURE VESSEL OF VEHICLE

(71) Applicant: Hyundai Motor Company, Seoul (KR)

(72) Inventors: Woo Min Kyoung, Gyeonggi-do (KR); Hyun Min Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/206,160

(22) Filed: Jul. 8, 2016

(65) Prior Publication Data

US 2017/0166046 A1 Jun. 15, 2017

(30) Foreign Application Priority Data

Dec. 10, 2015 (KR) .................. 10-2015-0175612

(51) Int. Cl.
*F17C 1/02* (2006.01)
*B60K 15/03* (2006.01)

(52) U.S. Cl.
CPC .......... *B60K 15/03006* (2013.01); *B60K 2015/03046* (2013.01)

(58) Field of Classification Search
CPC ......... B60K 2015/03046; B60K 2015/03006; F17C 1/02; F17C 1/16
USPC .............. 220/588, 586, 581, 601, 592
See application file for complete search history.

(56) References Cited

U.S. PATENT DOCUMENTS

| 4,589,563 A | * | 5/1986 | Born ............... B29C 49/76 220/581 |
| 5,518,141 A | * | 5/1996 | Newhouse ......... F17C 1/16 220/586 |
| RE41,142 E | * | 2/2010 | Blair ............ B60K 15/03006 220/23.2 |
| 2008/0251520 A1 | * | 10/2008 | Ota .................. F17C 1/16 220/586 |

FOREIGN PATENT DOCUMENTS

| JP | 2003-139296 A | 5/2003 |
| JP | 2004-144172 A | 5/2004 |
| JP | 2005-106142 A | 4/2005 |
| KR | 10-1998-0701861 A | 6/1998 |
| KR | 20-0315902 Y1 | 6/2003 |
| KR | 10-1105752 B1 | 1/2012 |
| KR | 2013-0038973 A | 4/2013 |
| KR | 2015-0106703 A | 9/2015 |

\* cited by examiner

*Primary Examiner* — King M Chu
(74) *Attorney, Agent, or Firm* — Mintz Levin Cohn Ferris Glovsky and Popeo, P.C.; Peter F. Corless

(57) ABSTRACT

A non-cylinder type composite pressure vessel of a vehicle is provided. The vessel includes a nozzle boss that includes a neck part having a hollow portion and a flange part that extends outward from the neck part. Additionally, a liner is engaged with the nozzle boss, thereby forming in the inside thereof a fluid filling space. The liner is formed stepped along a rim of an outer side of a reinforced area formed at an end portion of the fluid filling space.

6 Claims, 4 Drawing Sheets

NON-CYLINDER TYPE COMPOSITE PRESSURE VESSEL OF VEHICLE

CROSS-REFERENCE TO RELATED APPLICATION

This application claims under 35 U.S.C. § 119(a) the benefit of priority to Korean Patent Application No. 10-2015-0175612 filed on Dec. 10, 2015, the entire contents of which are incorporated herein by reference.

BACKGROUND (a) Technical Field

The present disclosure relates to a non-cylinder type composite pressure vessel of a vehicle, and more particularly, to a non-cylinder type composite pressure vessel of a vehicle that provides a uniform strength.

(b) Background Art

A composite pressure vessel is a vessel that contains a predetermined pressure level of gas or liquid, which is higher than atmospheric pressure. Due to the high specific stiffness, specific strength and fatigue resistance, the composite pressure vessel in general has been used for a hydrogen fuel cell vehicle, a natural gas vehicle, environmentally-friendly vehicle, etc. Such a composite pressure vessel is generally manufactured to have a metal-reinforced composite fiber wound and laminated around an inner side liner made of a polymer material with a predetermined shape and is molded at a high temperature and pressure.

When the above composite pressure vessel is formed in a cylindrical shape, a composite fiber may be uniformly wound around the whole inner side liner. For this reason, the strength of the vessel may be uniformly distributed, and any stress may be uniformly distributed. Accordingly, the pressure may be effectively distributed when storing a high pressure gas, thereby providing the maximum strength. However, since the cylinder type composite pressure vessel has a circular cross section, an unnecessary space may still remain inside after mounted in a package space of a vehicle (e.g., within a compartment of the vehicle). The storage capacity may not be obtained as much as the remaining space, so the cylinder type composite pressure vessel may be formed in a non-cylindrical shape having a predetermined space that corresponds to the package space.

Since the top of the above non-cylinder type composite pressure vessel is formed in a flat shape around which the winding of the normal composite fiber is not available, the winding of the composite fiber should be executed to change the shape of the top thereof The above information disclosed in this section is merely for enhancement of understanding of the background of the invention and therefore it may contain information that does not form the prior art that is already known in this country to a person of ordinary skill in the art.

SUMMARY

The present invention provides a non-cylinder type composite pressure vessel of a vehicle which may provide a uniform strength to a non-cylinder type pressure vessel to form a plurality of concentric steps at a reinforced area of an outer side of a liner where stress concentrates in the non-cylinder type composite pressure vessel.

Accordingly to one aspect, the non-cylinder type composite pressure vessel may include a nozzle boss comprising a neck part having a hollow portion, and a flange part that extends outward from the neck part; and a liner that engages with the nozzle boss to form a fluid filling space in the inside thereof, wherein the liner may be formed stepped along (e.g., step wise or at stepped levels) a rim of an outer side of a reinforced area formed at an end portion of the fluid filling space.

The above liner may include a cylinder part which has a quadrangular cross section, and a dome part which interconnects the cylinder part and the nozzle boss and is formed in a dome shape and may include the reinforced area formed flat on the upper surface thereof. In particular, the liner may further include a composite winding part formed in a concentric shape about the nozzle boss and formed stepped along a rim of an outer side of the reinforced area. Moreover, the composite winding part may be formed at the same step height around the nozzle boss, and a plurality of composites may be laminated along the stepped surfaces. The composite winding part may be configured to offset the step by adjusting the laminated height of the composite laminated on the stepped surfaces. Additionally, the height of each of the stepped surfaces may be equal to or greater than about 2 mm.

ADVANTAGEOUS EFFECTS

The non-cylinder type composite pressure vessel according to the present invention has an effect of providing a uniform strength to the non-cylinder type pressure vessel in such a way that a local composite winding is available with respect to a reinforced area by forming a plurality of concentric steps at the reinforced area of an outer side of a liner where stress concentrates in the non-cylinder composite pressure vessel. Since a desired strength may be structurally obtained at a reinforced area, it may be possible to preliminarily prevent any phenomenon where the reinforced area is fractured since stress concentrates on the reinforced area.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, includ-

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 1:
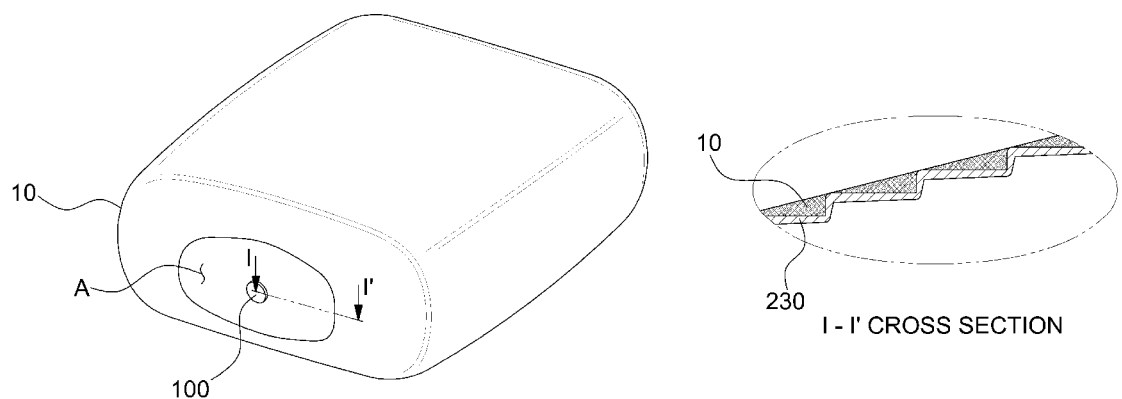
FIG. 1 is a view illustrating a non-cylinder type composite pressure vessel of a vehicle according to an exemplary embodiment of the present invention.
Figure 2:
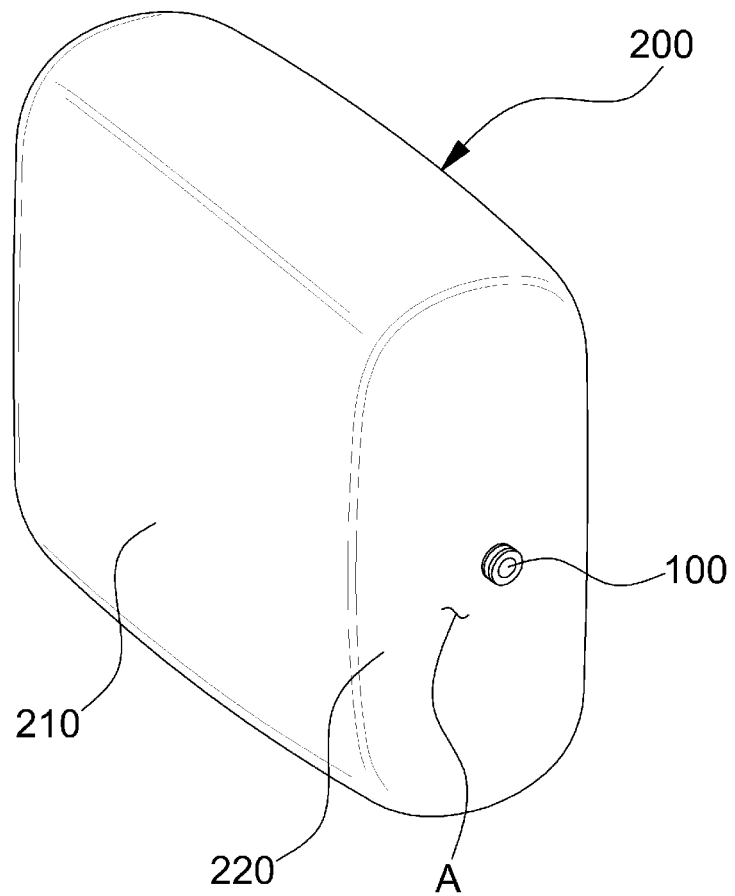
FIG. 2 is a view illustrating a configuration of a non-cylinder type composite pressure vessel of a vehicle according to an exemplary embodiment of the present invention.

FIG. 1 is a schematic view illustrating a non-cylinder type composite pressure vessel of a vehicle according to an exemplary embodiment of the present invention, and FIG. 2 is a view illustrating a configuration of a non-cylinder type composite pressure vessel of a vehicle according to an exemplary embodiment of the present invention.

As illustrated in FIG. 1 and FIG. 2, the non-cylinder type composite pressure vessel of a vehicle may include a nozzle boss 100, and a liner 200. The nozzle boss 100 is an outlet to discharge fluid stored in a fluid filling space and may include a neck part having a hollow portion and a flange part that extends outward from the neck part. The liner 200 may be engaged with the nozzle boss 100 to form a fluid filling space inside the liner 200. The liner 200 may be formed stepped along (e.g., at different height levels) a rim of an outer side of the reinforced area "A" formed at an end portion of the fluid filling space.

The liner 200 may include a cylinder part 210 and a dome part 220. The cylinder part 210 may have a quadrangular cross section wherein a fluid filling space may be formed. More specifically, the cylinder part 210 may include a fluid filling space in the inside thereof and may have a quadrangular cross section to store more fluid compared to a cylindrical shape. Moreover, the cylinder part 210 may be molded to have a quadrangular cross section. When the cylinder part 210 is mounted on a vehicle, the cylinder part 210 may be mounted without leaving any dead or unused space in the package space within a vehicle trunk, and thus, the package space may be used more efficiently.

Accordingly, the cylinder part 210 may obtain increased storage capacity by using the package space without leaving any dead space. Consequently, it may be possible to obtain the same storage capacity even though the package space is reduced based on the shape of the cylinder part 210. Further, the dome part 220 may be formed in a dome shape and may interconnect the cylinder part 210 and the nozzle boss 100. A reinforced area "A" may be formed flat on the upper surface of the dome part 220. Since the dome part 220 may interconnect the cylinder part 210 having a quadrangular cross section and the nozzle boss 100, the flat reinforced area "A" having a predetermined area may be formed near the nozzle boss 100 due to the structural configuration thereof.

More specifically, when the cylinder part 210 has a cylindrical cross section, the dome part 220 may be formed in a semispherical shape. When the cylinder part 210 is formed to have a quadrangular shape as in the present exemplary embodiment, the reinforced area "A" may be formed flat in interconnecting the cylinder part 210 and the nozzle boss 100. Since stress usually concentrates on the above reinforced area "A", a structural reinforcement is required to perform a local winding with respect to the reinforced area "A" in winding the composite 10 around the cylinder part 210 and the dome part 220.

When a composite 10 is wound around the outer side of the liner 200, a winding robot and a device for rotating the liner 200 may be used. Since the reinforced area "A" may be formed flat, there may be difficulty laminating the composite 10. Accordingly, a composite winding part 230 may be formed at the liner 200 according to an exemplary embodiment of the present invention. In the composite winding part 230, the reinforced area "A" may be formed to include a plurality of stepped surfaces as indicated by the line I-I' in FIG. 2. In particular, the composite 10 may be engaged with the stepped surfaces in winding the composite 10. Thus, the composite 10 may be effectively laminated on the liner 200. Consequently, a local reinforcement may be available with respect to the reinforced area "A".

Figure 3:
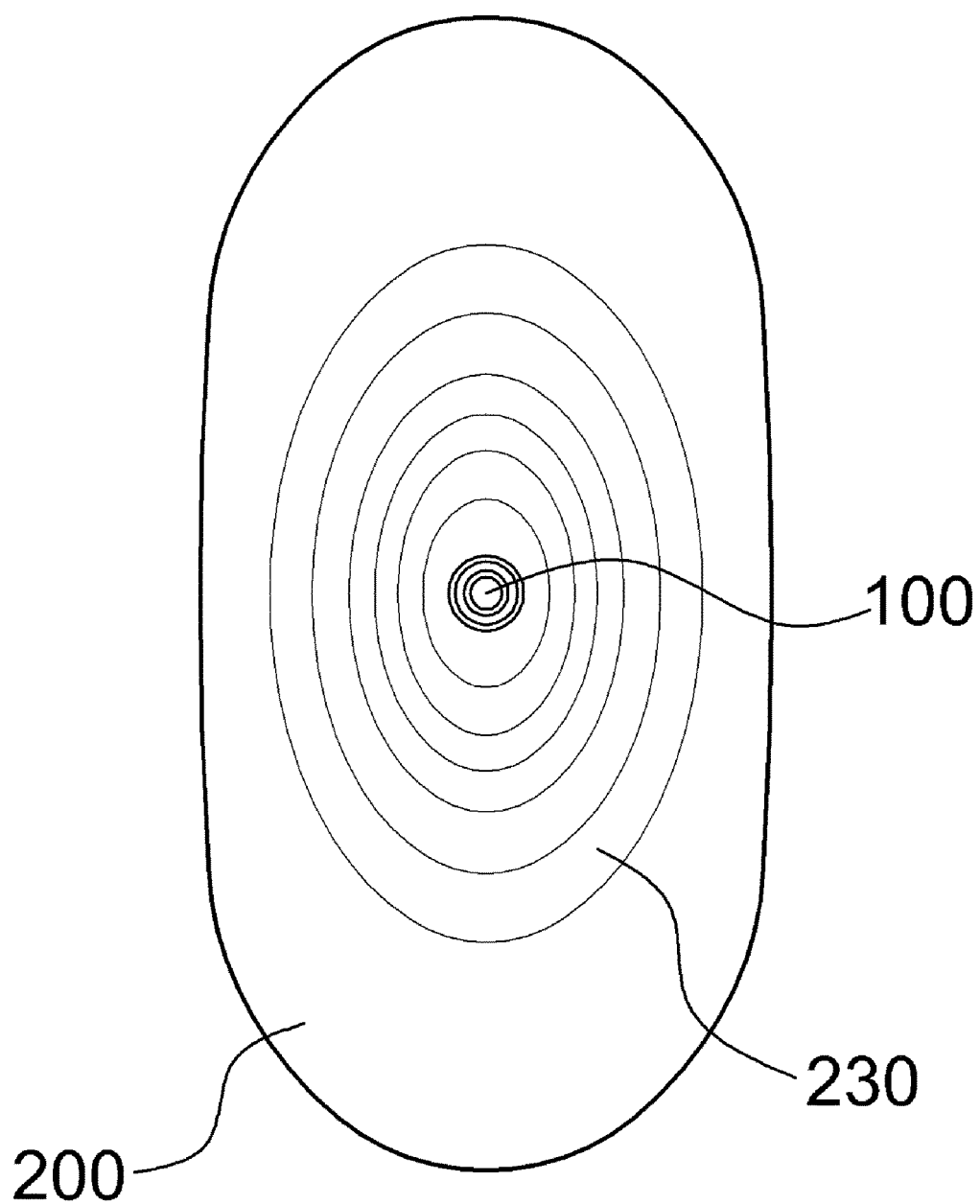
FIG. 3 is a view illustrating an upper surface of a composite winding part with respect to a non-cylinder type composite pressure vessel of a vehicle according to an exemplary embodiment of the present invention.
Figure 4:
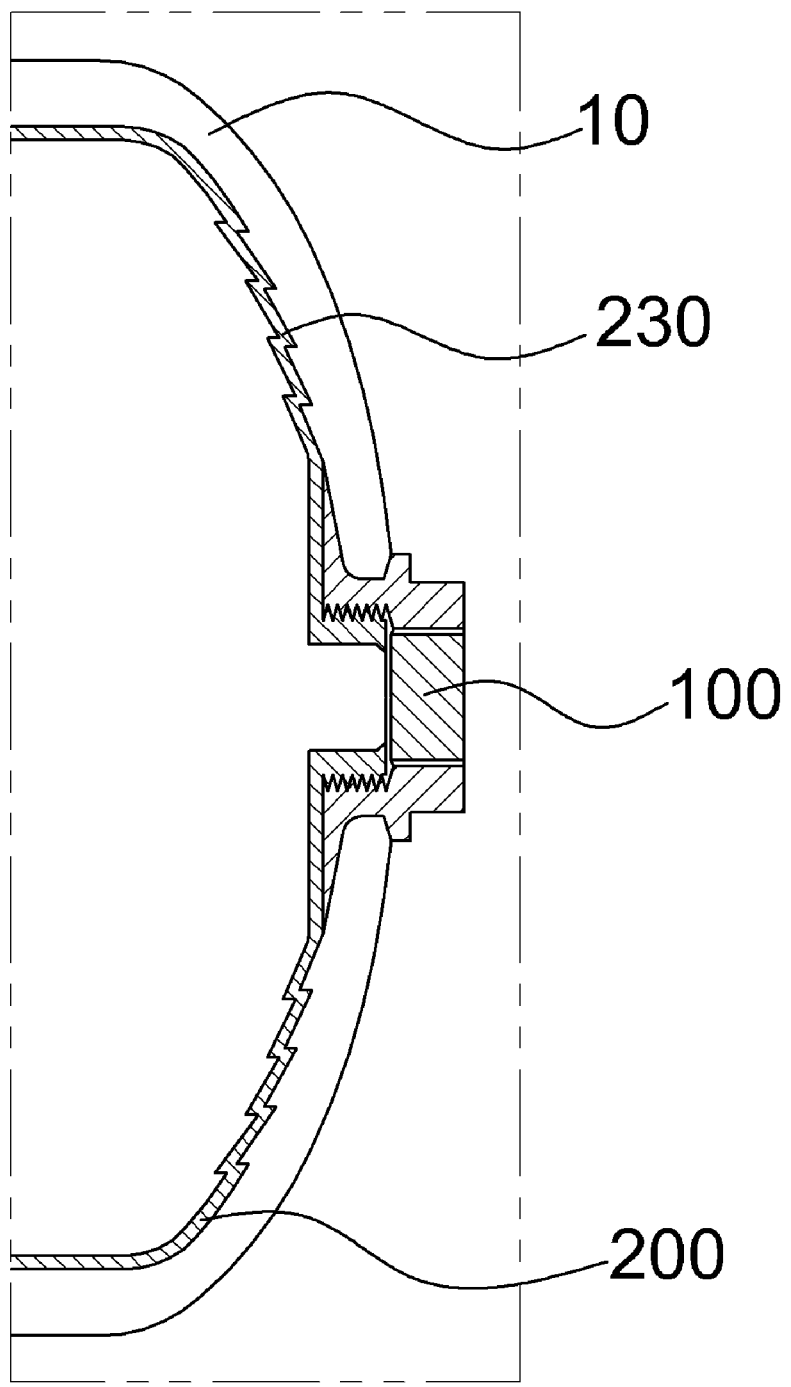
FIG. 4 is a view illustrating a lateral surface of a composite winding part with respect to a non-cylinder type composite pressure vessel of a vehicle according to an exemplary embodiment of the present invention.
Figure 5:
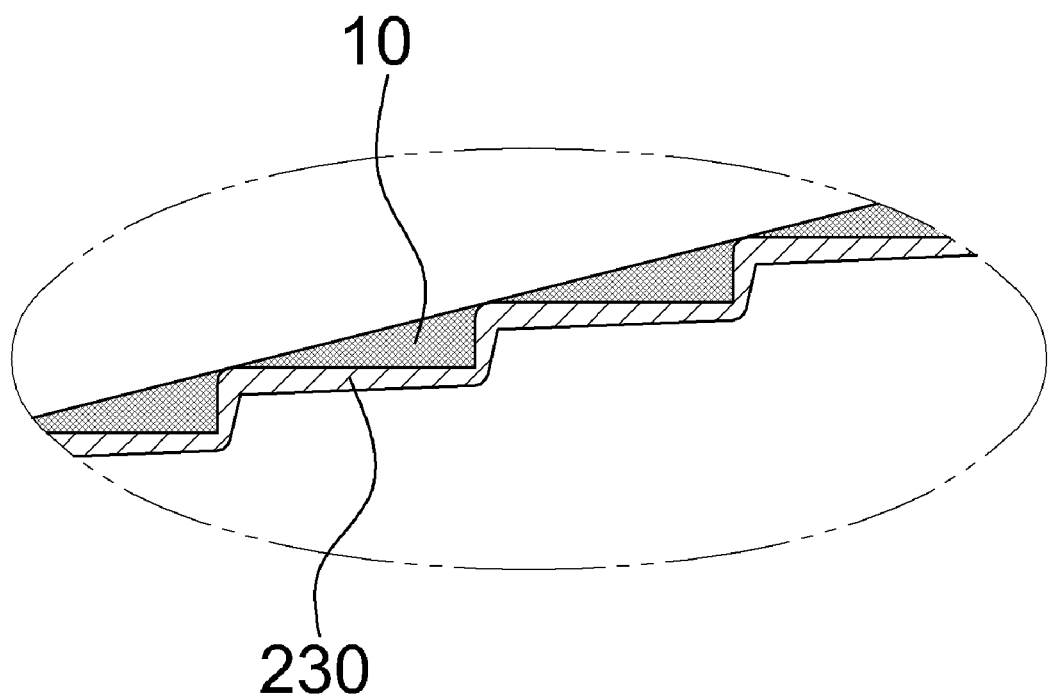
FIG. 5 is a view illustrating a stepped surface of a composite winding part with respect to a non-cylinder type composite pressure vessel of a vehicle according to an exemplary embodiment of the present invention.

FIG. 3 is a view illustrating an upper surface of a composite winding part with respect to a non-cylinder type composite pressure vessel of a vehicle according to an exemplary embodiment of the present invention, FIG. 4 is a view illustrating a lateral surface of a composite winding part with respect to a non-cylinder type composite pressure vessel of a vehicle according to an exemplary embodiment of the present invention, and FIG. 5 is a view illustrating a stepped surface of a composite winding part with respect to a non-cylinder type composite pressure vessel of a vehicle according to an exemplary embodiment of the present invention.

As illustrated in FIG. 3 and FIG. 4, the liner 200 may include a composite winding part 230 which is concentric about the nozzle boss 100 (e.g., formed therearound while sharing the same center). The composite winding part 230 may be formed stepped (e.g., at different heights) along an outer rim of the reinforced area "A" which is formed flat. Additionally, each of the stepped surfaces formed at the composite winding part 230 may have about the same step height. In the composite winding part 230 formed as described above, a plurality of composites 10 may be laminated along the stepped surfaces when winding the composite. The heights of the stepped surfaces may vary based on the sizes of the composite pressure vessels.

Furthermore, the heights of the stepped surfaces of the composite winding parts 230 may be equal to or greater than about 2 mm. More specifically, since the height, which is laminated once when winding the composite 10, may be about 0.7 mm, the stepped surface height may be about 2 mm or greater and thus, the composite 10 may be wound more than three times around each stepped surface. Meanwhile, the composite 10 laminated on the stepped surfaces of the composite winding part 230 as described above may be formed not to have any stepped surface after the laminating of the composite 10 is finished.

In other words, as illustrated in FIG. 5, the composite winding part 230 may be formed into the shape of the final composite pressure vessel wherein the step heights were offset by adjusting the laminated height of the composite 10 which was laminated on the stepped surfaces. Accordingly, the composite 10 may be wound less near the entry portions of the stepped surfaces in winding the composite 10. The composite may be wound more (e.g., more times) around the inner sides of the stepped surfaces than at the entry portions of the stepped surfaces. In this way, it may be possible to offset the step heights of the stepped surfaces, and the stepped surfaces may be filled with the composite 10.

In the exemplary embodiment of the present invention, since a local winding is available with respect to the flat reinforced area "A" by winding the composite 10 around the composite winding part 230, it may be possible to preliminarily prevent any fracturing phenomenon which may occur when stress concentrates on the reinforced area "A" where the stress usually concentrates. In the exemplary embodiment of the present invention, since a local winding is available with respect to the reinforced area "A", it may be possible to reduce the laminating of the composite 10 around the cylinder part 210 where stress does not concentrate compared to the reinforced area "A." As a result, the weight of the composite pressure vessel may be decreased.

In the present invention, a local composite winding may be possible with respect to a reinforced area in such a way to form concentric steps at the reinforced area of the outer side of the liner where stress concentrates in the non-cylinder type pressure vessel, and therefore the non-cylinder type pressure vessel may have a uniform strength. Moreover, since a desired strength may be structurally obtained at a reinforced area according to an exemplary embodiment of the present invention, it may possible to preliminarily prevent any fracturing phenomenon which may occur since stress concentrates on the reinforced area.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A non-cylinder type composite pressure vessel, comprising:
    a nozzle boss that includes a neck part having a hollow portion, and a flange part that extends outward from the neck part; and
    a liner which is engaged with the nozzle boss to form a fluid filling space in an inside thereof, wherein the liner is formed concentric stepped with respect to the nozzle boss along a rim of an outer side of a reinforced area formed at an end portion of the fluid filling space,
    wherein the liner includes a cylinder part which has a quadrangular cross section, and a dome part which interconnects the cylinder part and the nozzle boss and is formed in a dome shape and includes the reinforced area which is formed flat on an upper surface along with the dome shape thereof, and
    wherein a plurality of composites are laminated along a stepped surface which is formed along the entire dome part of the liner.

2. The vessel of claim 1, wherein the liner includes a composite winding part which is concentric about the nozzle boss and is formed stepped along a rim of an outer side of the reinforced area.

3. The vessel of claim 2, wherein the composite winding part is formed at a same step height around the nozzle boss.

4. The vessel of claim 3, wherein the composite winding part is configured to offset the step height by adjusting the laminated height of the composites laminated on the stepped surface.

5. The vessel of claim 3, wherein the height of each of the stepped surface is equal to or greater than about 2 mm.

6. The vessel of claim 3, wherein the heights of the stepped surface vary based on sizes of the composite pressure vessels.

* * * * *